United States Patent
Paige et al.

[15] 3,685,468
[45] Aug. 22, 1972

[54] LAWN AND TURF MAINTENANCE UNIT

[72] Inventors: Dennis D. Paige, Spartanburg, S.C.; Lewis E. Coleman, Columbia, Mo.

[73] Assignee: Automated Lawn Builders of the Midwest, Inc., Columbia, Mo.

[22] Filed: Feb. 3, 1970

[21] Appl. No.: 8,322

[52] U.S. Cl. ................. 111/11, 111/73, 111/77, 239/656, 222/561
[51] Int. Cl. ........................... A01c 7/08, A01c 7/18
[58] Field of Search ............ 111/11, 10, 8, 9, 78, 73; 222/71, 502, 559, 561, 49; 239/656; 172/554

[56] References Cited

UNITED STATES PATENTS

| | | | |
|---|---|---|---|
| 3,544,013 | 12/1970 | Dorfman | 111/11 |
| 3,446,165 | 5/1969 | Magda et al. | 111/11 |
| 2,914,006 | 11/1959 | Smith | 111/10 X |
| 208,625 | 10/1878 | Morgan | 111/73 |
| 2,966,218 | 12/1960 | Johnson | 111/10 X |
| 1,914,914 | 6/1933 | Handler | 111/10 X |
| 711,996 | 10/1902 | Moore | 111/78 |
| 3,441,224 | 4/1969 | Cotter et al. | 239/656 |

*Primary Examiner*—Robert E. Pulfrey
*Assistant Examiner*—Stephen C. Pellegrino
*Attorney*—Wellington M. Manning, Jr.

[57] ABSTRACT

A lawn or turf unit for preparing and/or maintaining a lawn and having all the necessary equipment for doing same, including a plurality of dispensing bins to contain the various materials that should be applied to the particular lawn, a positive metering system for accurately dispensing a predetermined amount of material from each bin, a broadcaster for accurately and properly spreading the material onto the lawn, a combined aerating and rolling device for simultaneously rolling and aerating the lawn, if desired, and a tank and spray head assembly for applying liquids to the lawn. The unit of the present invention is propelled by a motive power means and is uniquely designed so as to negotiate complex manuvers to enable complete and proper coverage of the lawn. Each material bin is equipped with multiple controls for limiting the amount of material to be dispensed therefrom in addition to a positive metering device for removing materials from the bin at a constant rate whereby a truly accurate amount of material may be applied to the lawn.

23 Claims, 7 Drawing Figures

INVENTORS.
DENNIS D. PAIGE
LEWIS E. COLEMAN
BY
ATTORNEY

INVENTORS
DENNIS D. PAIGE
LEWIS E. COLEMAN
BY Wellington M. Manning Jr.
ATTORNEY

LAWN AND TURF MAINTENANCE UNIT

BACKGROUND OF THE INVENTION

The building and later the maintenance of a lawn has customarily been accomplished by a series of individual operations. These separate operations will normally involve preparations of the ground for seeding; fertilizing and watering. The seed will thus germinate in the soil after having been properly placed in the soil and will grow to produce the lawn. Once the lawn begins to grow it then becomes necessary to maintain same by the application thereto of fertilizers, additional seeds if necessary, pesticides, herbicides, fungicides and the like. Additionally, it is desirable to periodically aerate the lawn and to roll the lawn to achieve a good result. All of these operations have historically been accomplished separately and each requires excessive labor, time and costs. Moreover, in conducting these operations, different equipment has previously been used for each of the operations, such as, for example, an aerator for producing a series of openings or holes in the surface of the lawn to permit air to circulate around the root system of the grass. Additionally, a separate roller has been used to compact the lawn; a fertilizer spreader has been used to spread the seed and later the various granular materials that are necessary such as the fertilizers, herbicides, and the like and lastly, a spray system has been separately used to apply the various liquid materials to the lawn that may be required.

In addition to the numerous operations that have heretofore been required to produce and maintain a beautiful lawn, a further problem exists in how to properly care for a lawn. Each geographical area, and in many circumstances, different lawns in a particular geographical area require treatment with different materials. Specifically, the composition and amount of fertilizer etc that should be applied is dictated by the chemical analysis of the soil in which the particular lawn is grown. Hence it has been necessary for the home owner to possess some knowledge of horticulture. Transiency of the general populace today dictates that the average home owner will move generally three or four times and accordingly with each move must again determine the optimum fertilizer, pesticide, fungicide, etc requirements for maintenance of a good lawn for the new locale. Moreover, the excessive time required for the multiple passes over the lawn to perform the individual operations of preparation, seeding, fertilizing, etc deplete the available free time of the individual.

All industries are quire conscious today of appearance, and accordingly take great pride in the grounds surrounding the new offices and manufacturing facilities that are being erected. Normally these industrial grounds include large lawns and care and upkeep of these lawns is quite a burdensome task, especially in a short labor market. Units such as is described herein are needed by industry to economically maintain the large lawns as well as for the lawns and surroundings for homes, office buildings, schools, parks, athletic fields and the like. Use of the present invention saves time and money and produces a far superior end product.

Continuous innovation in the horticultural equipment field has brought about numerous developments that improve the various operations mentioned above or combine some of the operations mentioned above. In this regard, there are now on the market, units which, to some extent, accomplish the same purposes as are accomplished by the unit of the present invention. As with these other devices, the present invention teaches a lawn building and maintenance unit that now performs combined functions in a manner heretofore unattainable due to erroneous application of materials and/or lack of suitable equipment. Specifically, though existing equipment has been available for a composite dispensing of materials onto a lawn, aeration of a lawn and rolling of a lawn, such equipment is lacking for the following reasons. First and foremost, as mentioned above, each particular lawn requires a very specific type fertilizer and the like, and also for optimum results, very specific amounts of the compounds must be applied per square yard.

Prior equipment has attempted to control the amount of material that is applied to the lawns, but the degree of control has been sufficiently inaccurate that proper amounts of materials could not be evenly applied across the entire lawn or grounds. Moreover, depending upon the season of the year and the type lawn that is being maintained, it may or may not be desirable to roll the lawn during a particular operation. Accordingly, whereas the prior art equipment teaches permanent roller installation, the unit of the present invention teaches a combined aerator-roller device that may be withdrawn to an inoperable state whereby the lawn will not be rolled other than the minor degree that is produced by the pressure of the turf tires of the motive power unit and the lawn treating unit itself. Additionally, the unit of the present invention is an advance over the prior art, in that, due to its unique construction, the manuverability of the unit is such that the very tortuous and complex turns often required in the complete treating of a lawn are now within the realm of possibility.

The prior art contains references that relate to the various functions performed by the apparatus of the present invention. Such references do not, however, either alone or in combination teach or suggest the apparatus of the present invention. Exemplary of the prior art are Thomas, U.S. Pat. No. 544,470; Handler, U.S. Pat. No. 1,914,915; McDonald, U.S. Pat. No. 2,730,054; Neff, U.S. Pat. No. 2,733,838; Neff, U.S. Pat. No. 2,876,013; Simonsen, U.S. Pat. No. 2,946,597; Johnson, U.S. Pat. No. 2,966,218; Hamby, et al., U.S. Pat. No. 3,362,584; Cox, U.S. Pat. No. 3,367,293; Cotter, et al., U.S. Pat. No. 3,411,224, and Magda, et al., U.S. Pat. No. 3,446,165.

SUMMARY OF THE INVENTION

It is an object of the present invention to provide an improved lawn building and maintenance unit.

It is a further object of the present invention to provide an improved lawn building and maintenance unit that very accurately meters, from individual dispensing bins, predetermined amounts of granular materials onto a predetermined area of soil or lawn; is capable of both aerating and rolling the lawn in a simultaneous operation to achieve better aeration than was heretofore attainable; to spray the lawn with liquid materials that are necessary for proper maintenance of the lawn and to possess the ability to negotiate virtually any turn so as to insure complete treatment of the entire lawn.

Generally speaking, the present invention is directed to a lawn maintenance unit comprising a support frame, said frame having a set of wheels at one end thereof and being adapted for connection to a motive power means at an opposite end thereof; a plurality of dispensing bins mounted on said frame, each said bin having a discharge chute at its lower end; an accumulator box positioned immediately beneath each said dispensing bin and in communications therewith, said accumulator box having an adjustable opening at its lower end, said opening being adjustable in more than one direction; a driven metering gear operatively associated with the adjustable opening of said accumulator box to controllably remove from said accumulator box a predetermined amount of material; a funnel common to all accumulator boxes to receive material metered therefrom; a driven material spreader positioned beneath said funnel to receive material therefrom and spread same over a predetermined area of surface; and drive means for said metering gear and said material spreader.

The unit of the present invention further comprises a combined aerating and rolling device that is adjustably mounted beneath said frame and is movable into and out of engagement with the surface to be treated. The combined aerating and rolling device is comprised of two elongated cylinders having a plurality of specifically positioned tines around the periphery thereof and extending outwardly therefrom. The tines are positioned so as to produce a series of adjacent diamonds across the face of the device, each point of the diamond being represented by a tine. Moreover, the tines are positioned such that immediately prior to ingress of a tine into the surface to be treated, the surface has been rolled by the portion of the device between the tines.

The unit of the present invention more specifically includes a drive means for the metering gears that is directly related to the speed of the unit as it passes over the surface to be treated. In this manner, a like amount of material will be applied over the surface regardless of the speed of the unit. Furthermore, the drive means for the metering gears contains in the drive chain a roller clutch which engages when the unit is moving in a forward direction to transmit driving power to the metering gears. When the unit is being moved in a backwards or reverse direction, however, the roller clutch disengages and the metering gears remain in an unoperational state. A further specific feature with respect to the drive chain is an off-on switch means which may be used to disengage the driving force to the metering gears during the forward movement of the unit when desired.

The lawn treating unit of the present invention represents a further advantage over the prior art, in that, it preferably is pushed by a motive power means, such as, for example, a small tractor unit. Pushing of the unit, allows the tortuous turns that are necessary in completely treating a majority of home lawns to be negotiated quite readily, whereas if the unit were being pulled, then the unit will follow the path of the tractor and small areas in the corners, for example, may remain untreated.

The unit of the present invention may be ideally operated by a single individual to professionally custom-treat a lawn. In other words, the operator, after appropriate training will be able to analyze the soil and to administer to the soil appropriate predetermined materials as well as accurate metering of the appropriate predetermined amounts of materials to optimize growth and condition of the lawn.

DESCRIPTION OF THE PREFERRED EMBODIMENTS

Figure 1:
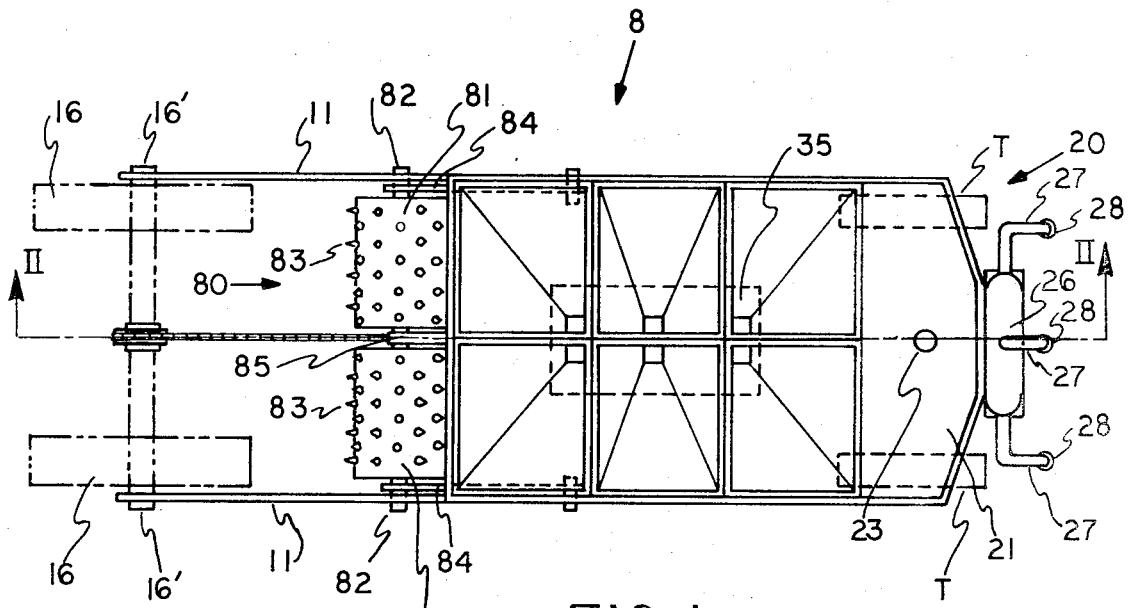
FIG. 1 is a top view of the lawn maintenance unit of the present invention.
Figure 2:
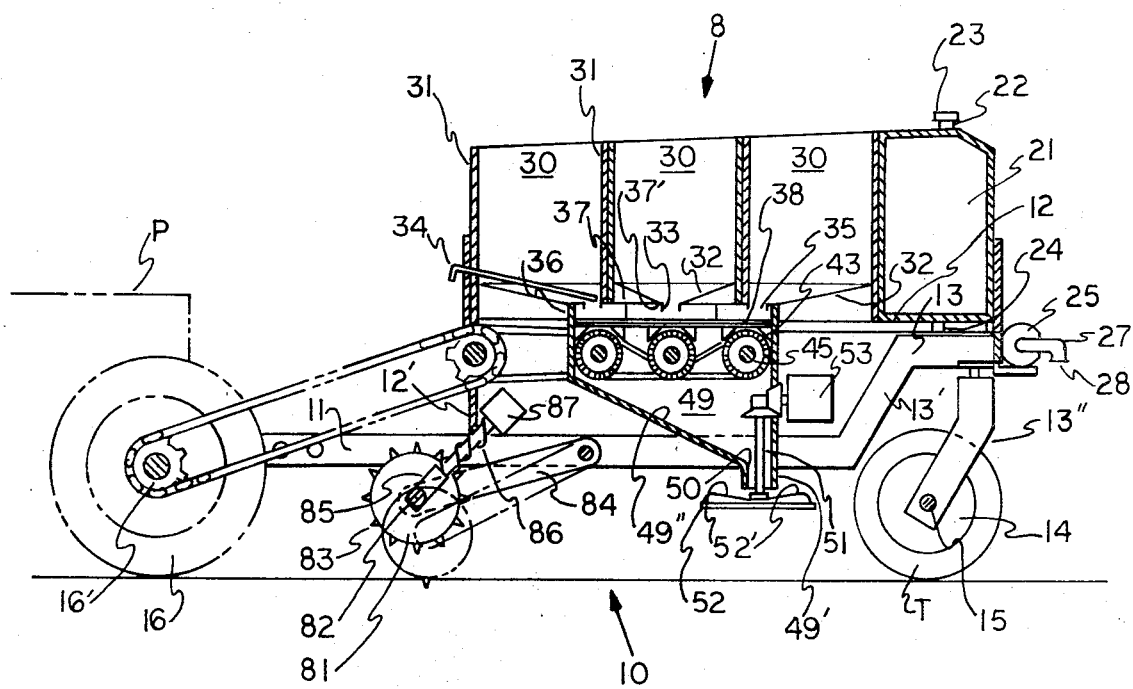
FIG. 2 is a side section view of the lawn maintenance unit of the present invention, the section being taken along lines II—II.

Referring to FIGS. 1 and 2 the overall lawn building and maintenance unit may be visualized. The lawn maintenance unit generally indicates as 8 comprises a main frame generally indicated by the numeral 10. Frame 10 is made up of base longitudinal supports 11, bin support members 12 and 12' and wheel support members 13 and 13'. Two freely rotatable wheels 14 are suitably mounted on axles 15 that are journaled in support members 13''. Support members 13'' are in turn attached to support member 13 and adapted for swivel movement with respect thereto. Wheels 14 support the front end of maintenance unit 8 and are equipped with turf tires T so as to pass over the lawn without causing damage thereto. The rear end of the maintenance unit is adapted to be attached to a motive power source P (shown partially in phantom). Frame 10 is shown to be attached to an axle 16' that holds front wheels 16 of power source P. The connection to motive power unit P as shown contemplates a power unit that is hinged for turning intermediate its frame. A power unit that depends upon turning of the front wheels for direction would obviously be connected to unit 8 in a manner where turning would be feasible at the point of connection. Motive power source P may be a separate unit from the lawn maintenance unit of the present invention or may be integral therewith. For all practical purposes, the connection between power source P and unit 8 is permanent unless repairs are needed for one of the units. It is preferable as shown, to use the power source P to push maintenance unit 8 so as to achieve better manuverability during operation. Power source P may, however, be employed to pull the maintenance unit 8. A very suitable motive power source P is a lawn utility tractor, though many others may be suitably substituted therefor.

Maintenance unit 8 is equipped with apparatus for simultaneously conducting the numerous operations on the surface to be treated. A liquid container tank generally indicated as 20 is positioned along the front end of unit 8, being supported by support members 12 and 13 and affixed thereto. Container 20 is provided for the liquid ingredients that are to be applied to the surface of the lawn or turf and comprises a holding tank 21 having a top thereon, and an inlet spout 22 in the top that is covered by a removable cap 23. An outlet 24 is provided at the bottom of tank 21 and leads to a sump (not shown). Adjacent the sump is a pump (not shown) which removes liquid from the sump and forces same into a spray header 26. Spray header 26 has connected thereto and extending outwardly therefrom a plurality of spray pipes 27 having nozzles 28 at the forward ends thereof. Spray pipes 27 and nozzles 28 are adjustable so as to permit proper spray application of liquid onto the particular lawn being treated.

A plurality of dispensing bins 30 are removably mounted on frame 10, said bins being particularly supported by bin support members 12 and 12'. Bins 30 each have four side walls 31 and sloped bottom walls 32. Bins 30 are normally used with their tops open to the atmosphere though covers may be applied thereto if desired. Bottom walls 32 of each bin 30 slope in a direction to facilitate movement of materials to be dispensed to a dispensing spout 33 that is formed by the juncture of bottom walls 32. Each bin 30 is also provided with an inclined slide member 34 which is used to open or close dispensing spout 33. Slide member 34, for the sake of simplicity, is shown only for one bin 30 in FIG. 2. As shown in FIGS. 1 and 2, all bins 30 are preferably constructed and positioned so as to present all of the spouts 33 in the same immediate area, the purpose of which will be more clearly seen hereinafter.

Beneath spouts 33 of bins 30 is located an accumulator box 35 which receives material from spouts 33 that is to be applied to the lawn being treated. Accumulator box 35 is comprised of exterior side walls 36, top wall 37 having a plurality of spout receiving openings 37', and bottom wall 38 having a plurality of dispensing openings 38' (See FIG. 3). Accumulator box 35 also has a plurality of internal walls 36' which divide box 35 so as to present a separate compartment 35' under each spout 33 (See FIG. 4). Dispensing openings 38' are provided with means to vary the size of said openings in two directions. Immediately below openings 38' are metering slides 39, one slide being provided for each bin 30 that is present. Slides 39 are slideably mounted in a slide frame 39', said slide frame 39' being sandwiched between accumulator box 35 and framework 44 that carries metering bars 43 (to be discussed hereinafter). Metering slides 39 are movable toward or away from the center of the unit 8 to increase or decrease the size of dispensing opening 38'. Further, as may be seen in FIG. 5, metering slide 39 is comprised of a plate 40 having a rod 41 extending outwardly therefrom, said rod having a nob 42 affixed at its outer end. Rod 41 of metering slide 39 is provided with graduations 41' along its length to enable one using unit 8 to properly set the size of dispensing opening 38' to pass a predetermined amount of material. The second control for the size of opening 38' according to the size of granules or particulate material being dispensed. This second control is provided by metering bars 43. Metering bars 43 are positioned immediately beneath metering slides 39, are mounted on framework 44 and are capable of movement in directions transverse to the direction of movement of metering slides 39. Metering bars 43 ride partially atop framework 44, resting on members 44'. A releasable clamping means 43' secures metering bars 43 to members 44' at the desired location. Releasable clamping means 43' can be any conventional clamping or bolt means or the like. To modify the size of dispensing opening 38' for a particular bin clamping means 43' are loosened, metering bars 43 under the particular bin are moved along member 44' to the desired new location and clamping means 43' are then tightened again to secure metering bar 43 in the new location. A further feature of importance regarding metering bars 43 is the configuration of the underside thereof. The underside 43'' of metering bars 43 is angled such that each bar 43 serves as a cleaning surface for its adjacent fluted metering gear 45. Thus undersides 43'' of metering bars 43 limit the amount of material removed from accumulator box 35 to an amount that just fills the flutes 45' of metering gears 45.

Figure 3:
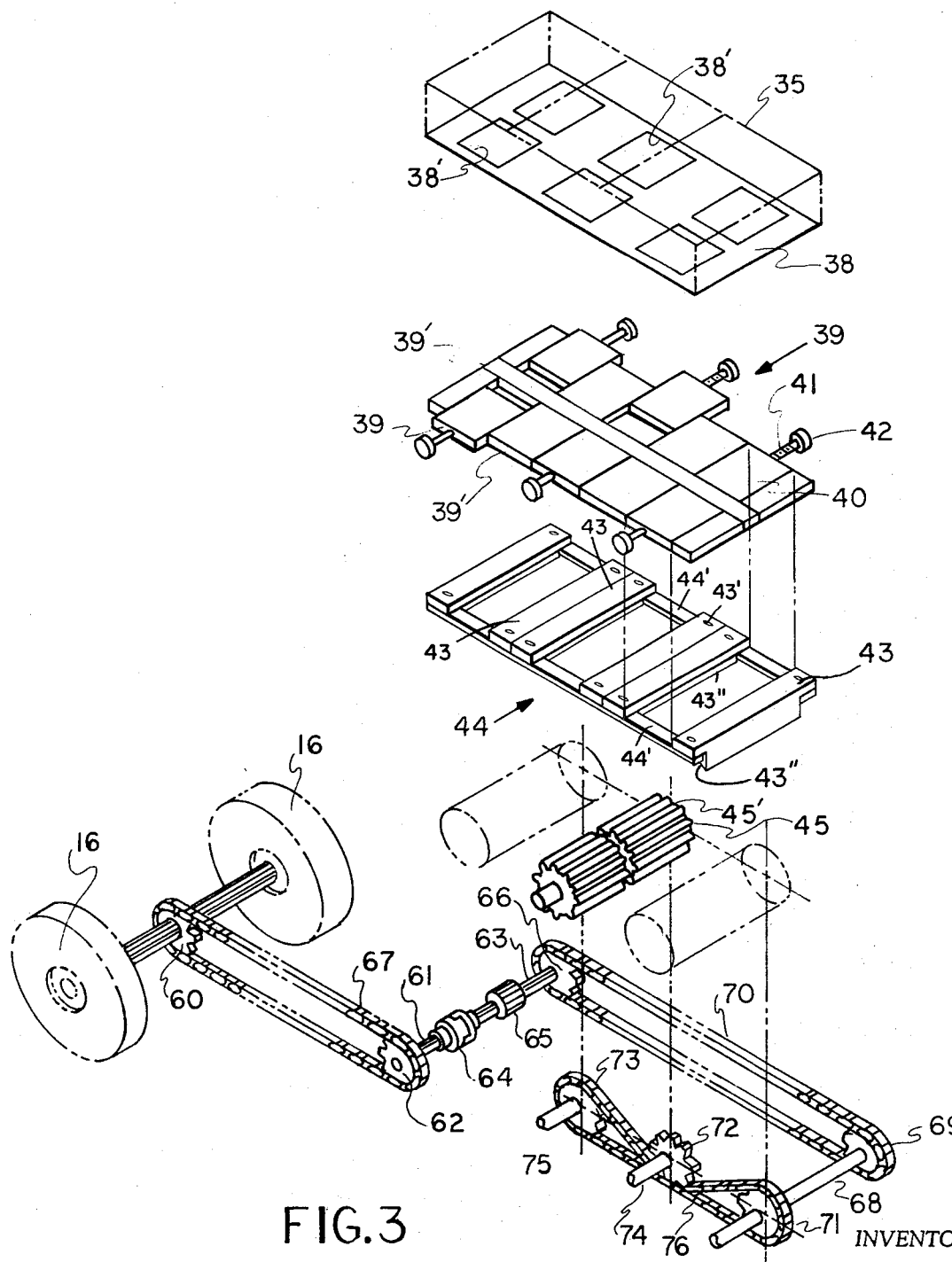
FIG. 3 is an exploded view of the metering system of the lawn maintenance unit of the present invention and the drive train associated therewith.
Figure 4:
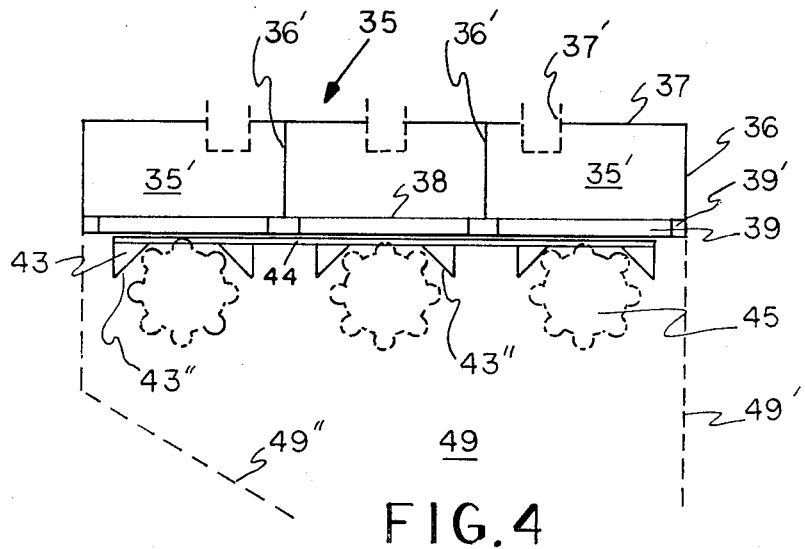
FIG. 4 is a blown up partial section of the accumulator box and metering system of the present invention as taken from FIG. 2.
Figure 5:
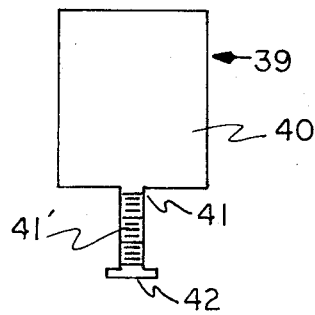
FIG. 5 is a blown up plan view of a metering slide of the accumulator box system of the present invention.

As may be best seen in FIGS. 2, 3 and 4 a fluted metering gear 45 or portion thereof is positioned immediately beneath each dispensing opening 38' of accumulator box 35. Metering gears 45 have a plurality of flutes or grooves 45' around the peripheries thereof. Flutes 45' receive material from dispensing openings 38' and after a partial revolution of gear 45 discharge the material into a common chute 49. Chute 49 is positioned immediately beneath metering gears 45 and is comprised of vertical side walls 49' and inclined bottom wall 49''. Inclined bottom wall 49'' presents an inclined surface onto which materials are deposited from metering gears 45 and which, after being deposited thereon move down said surface to an opening 50 through which said materials flow to be broadcast onto the surface to be treated. Located in opening 50 is a shaft 51 which is, through a suitable gearing arrangement, suspended from vertical wall 49' of chute 49. A spreader plate 52 is attached to the lower end of shaft 51, just beneath opening 50. Shaft 51 operatively associated at its upper end to a motor 53 which, when operational, imparts rotation to shaft 51 which in turn causes spreader plate 52 to rotate. Spreader plate 52 has a series of ribs 52' extending upwardly therefrom which during rotation of the spreader plate expel the materials from plate 52 in a uniform manner. Motor 53 which produces rotation to shaft 51 and spreader plate 52 may be any suitable power means, but preferably is an electric motor operated by the 12 volt battery system that is used on the motive power means P. As such, suitable control means (not shown) are located on the motive power means P to control operation of motor 53 which in turn controls operation of spreader plate 52.

Proper dispensing of materials from bins 30 depends not only upon the size of the openings 38' in accumulator box 35, but also upon the speed of rotation of metering gears 45. So long as off-on slides 34 are open, material from bins 30 keeps the respective sections 35' of accumulator box 35 full of material. Hence the amount of material dispensed is also related to the speed of rotation of metering gear 45. Metering gears 45 are rotated in unison at a speed directly proportional to the forward speed at which the lawn treating unit 8 traverses the lawn by virtue of the following arrangement. Referring to FIG. 3, axle 16' of motive power means P has a gear sprocket 60 mounted thereon. A shaft 61 is rotatably mounted to frame 10 of unit 8 and has a sprocket 62 affixed to an end thereof, said sprocket 62 being in line with sprocket 60. Shaft 61 is coupled to a further shaft 63 by a one way roller clutch 64, said shaft 63 also being rotatably mounted to frame 10. Shaft 63 further has an off-on switch means 65 mounted thereon and a third sprocket 66 attached to the end thereof opposite roller clutch 64. A link chain 67 or other suitable means connects sprocket 60 and 62 to transmit power from axle 16' to the metering system of unit 8. Frame 12 has a further shaft 68 rotatably attached thereto. Shaft 68 has a sprocket 69 mounted on one end thereof in front of sprocket 66 that is mounted on shaft 63. A link chain 70 or other suitable means operatively connects sprocket 66 to sprocket 69 to provide rotation thereto. Intermediate the length of shaft 68 is a further sprocket 71 that is associated with one of the metering gears 45. In line with sprocket 71 are sprockets 72 and 73, each of which is mounted on shafts 74 and 75 respectively and each of which is also associated with a metering gear 45. A link chain 76 operatively connects the metering gears 45 such that rotation of shaft 68 causes simultaneous rotation of all the metering gears through sprockets 71, 72 and 73 and chain 76.

Following the operation of the above described drive train for metering gears, one may visualize that the metering gears 45 operate only when the switch means 65 is in the on condition and further, only when the motive power means P is moving in a forward direction. When switch means 65 is in the off condition, no power is transmitted to sprocket 66 and hence metering gears 45 remain idle. Also when motive power means P moves in the reverse or rearward direction, roller clutch 64 disengages so that metering gears 45 do not rotate.

As mentioned earlier, the present invention also has a combined aerating-rolling device generally indicated by the numeral 80. The aerating-rolling device 80 is suspended from longitudinal support members 11 just behind bins 30. Referring to FIGS. 1 and 2 the aerating-rolling device 80 is illustrated to comprise two cylindrical rollers 81 mounted on an axle 82 and having a plurality of tines 83 positioned around the periphery thereof and extending outwardly therefrom. Axle 82 is supported on each end by arms 84 which are pivotably secured to support 11 of frame 10. Intermediate the length of axel 82 and between rollers 81, an internally threaded sleeve 85 is journaled around axel 82. A worm gear 86 mates with the internal threaded portion of sleeve 85 at one end and is affixed to a motor 87 at an opposite end. Actuation of motor 87 causes worm gear 86 to rotate which causes sleeve 85 to move up worm gear 86 or to move down worm gear 86. Hence depending upon the direction of rotation of worm gear 86, the aerating-rolling device 80 is moved downwardly into operational contact with the surface to be treated or is withdrawn from contact with the surface to be treated. Motor 87 may be any suitable type motor, though a motor operated by the 12 volt battery system from the motive power means P is quite acceptable.

Controls for operation of motor 87 are not shown, but are conventional and may be conveniently mounted on the motive power means P, within easy reach of the operator.

Figure 7:
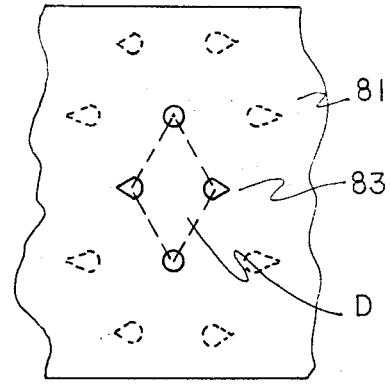
FIG. 7 is an enlarged view of a portion of the surface of one of the combined aerator-roller devices of the present invention showing the particular placement of tines.
Figure 6:
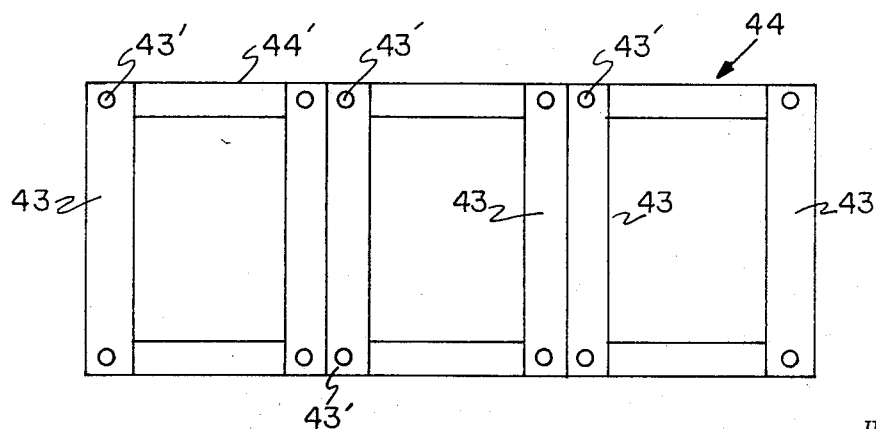
FIG. 6 is a plan view of the metering bars of the accumulator box system of the present invention.

Insofar as rollers 81 are concerned, reference is made to FIG. 7 where specific positioning of tines 83 is shown. Aerating-rolling device 80 is adapted to be withdrawn out of operation when unit 8 is used in a situation where it is not desirable to roll or aerate the surface being treated. When, however, it is desirable to roll and aerate the surface, proper aerating and rolling is just as important as the proper application of the various compounds onto the surface. Accordingly, the tines 83 are strategically placed around the periphery of roller 81 so as to aerate a large surface area and also so as to permit rolling of the lawn immediately prior to ingress of a tine 83 into the lawn. Both of these facts are accomplished by the arrangement of tines 83 so as to form a series of adjacent diamonds D (outlined in broken lines) across the surface of rollers 81. The size of the diamond is determined by the size rollers 81 being employed. Two rollers 81 are shown in the accompanying drawings. Use of two rollers 81 instead of one roller that extends across the width of the area to be treated prevents scuffing of the lawn during manuvering of unit 8 across the lawn.

Now that the apparatus of the present invention has been described, operation of the unit should be briefly discussed so as to facilitate a better understanding thereof. Certain particular compounds for treating a specific lawn are placed in the desired number of bins 30 of the maintenance unit 8 of the present invention. According to predetermined information, the openings at the bottom of accumulator box 35 are individually adjusted to permit egress of a certain amount of particular material from each of the material hoppers. So long as switch means 65 is in the off position or the unit 8 is sitting idle, no material will leave accumulator box 35 to be deposited on the surface to be treated. When, however, it is desirable to begin treating the lawn, a control switch is thrown to place switch means 65 in the on position so as to permit the metering gears to be operational. As the unit moves forward, power is transferred from the front axle 16' of the motive power means, through the one way clutch 64 and is transferred to the metering gears 45 to permit metering gears 45 to rotate at a speed relative to the speed of wheels 16 of motive power unit. Preferably metering gears 45 turns at a 1:1 ratio with axle 16 of power means P. As the unit moves forward metering gears 45 continue to rotate and remove predetermined amounts of materials from accumulator box 35 and bins 30.

All of the controls for the instant unit with the exception of the settings on the accumulator box are placed on the motive power means P. Hence the rotating spreader, the aerator-roller device, the spray system and the like are all controlled by the operator from the motive power means. As the unit begins to move forward the operator, by manipulation of the controls causes motor 53 to be energized to cause plate 52 to rotate whereby material falling from rotating metering gears 45 into hopper 49 moves down sloped wall 49'' of hopper 49 onto dispenser plate 52 and as plate 52 rotates, the composite mixture of materials is broadcast onto the surface to be treated. In a like manner as the unit 8 moves forward the combined aerator-roller units 80 rotate at a speed relative to the speed of the unit to roll and aerate the surface to be treated.

Once the settings have been determined for applying a predetermined amount of material to a prescribed surface area, the unit may be passed over this prescribed area at any desired speed and the same amount of material will be applied thereto. In a like manner, in the event that a liquid spray is required for treating the particular lawn, the liquid may be contained in tank 20 and may be sprayed onto the lawn through header 26 and out nozzles 28 onto the surface of the lawn. Controls for the liquid spray system, though not shown are conveniently mounted within reach of the operator on motive power means P.

Having described the invention it will become apparent to those skilled in the art that variations and modifications may be made hereto without departing from the spirit of the invention. Accordingly, the scope of the present invention should be governed by the appended claims.

What is claimed is:
1. A lawn building and maintenance unit comprising:
   a. a support frame, said frame being adapted for connection to motive power means;
   b. a dispensing bin mounted on said frame, said bin having a dispensing opening at the bottom thereof;
   c. an accumulator box positioned beneath and in communication with said dispensing bin and having an opening at the bottom thereof, said opening in said accumulator box having a metering slide associated therewith, said slide being operable to adjust the size of said opening in a first direction;
   d. metering means positioned beneath said accumulator box and in communication therewith through said opening in said accumulator box, said metering means being mounted for rotation;
   e. two metering bars positioned between said metering slide and said metering means, one said bar being located on a side of said accumulator box opening opposite said other bar, said bars being operable to adjust the size of said accumulator box opening in a second direction;
   f. spreader means located beneath said metering means for receiving material metered from said accumulator box and broadcasting same over a surface being treated; and
   g. drive means for said metering means and said spreader means.

2. A lawn building and maintenance unit as defined in claim 1 wherein said frame has at least one wheel connected to an end thereof opposite the end adapted for connection to motive power.

3. A lawn building and maintenance unit as defined in claim 1 wherein said dispensing bin is equipped with an off-on slide to control the condition of the dispensing opening.

4. A lawn building and maintenance unit as defined in claim 1 comprising further a liquid dispensing tank, said tank being operatively associated with pump and spray means for spraying liquid from said tank onto a surface being treated.

5. A lawn building and maintenance unit as defined in claim 1 wherein drive means for said metering means are supplied from motive power means, said drive means comprising a chain drive system.

6. A lawn building and maintenance unit as defined in claim 5 wherein said chain drive system has incorporated therein one way clutch means for transmitting driving power in one direction only.

7. A lawn building and maintenance unit as defined in claim 1 further comprising material diverter means located between said metering means and said spreader means for receiving material from said metering means and diverting same onto said spreader means.

8. A lawn building and maintenance unit as defined in claim 1 wherein said spreader means comprises a rotatable plate, said plate having a plurality of ribs affixed thereto and extending upwardly therefrom.

9. A lawn building and maintenance unit as defined in claim 1 comprising further aerating and rolling means attached to said frame.

10. A lawn building and maintenance unit as defined in claim 9 wherein said aerating and rolling means are a combined aerating and rolling device, said device comprising at least one cylindrical member having a plurality of tines positioned around the periphery thereof.

11. A lawn building and maintenance unit as defined in claim 10 wherein said combined aerating and rolling device is equipped with raising and lowering means.

12. A lawn building and maintenance unit as defined in claim 10 wherein said tines are positioned around the periphery of said cylindrical member in such a manner that the surface to be aerated is rolled immediately prior to being aerated by each tine.

13. A lawn building and maintenance unit as defined in claim 12 wherein said tines are positioned around the periphery of said cylindrical member such that said tines define a series of adjacent diamonds.

14. A lawn building and maintenance unit as defined in claim 1 comprising further motive power means.

15. A lawn building and maintenance unit comprising:
   a. a support frame, said frame having at least one wheel attached to one end thereof and being adapted for connection to motive power means at an opposite end thereof;
   b. a plurality of dispensing bins mounted on said frame, each said bin having a dispensing opening in the bottom thereof;
   c. an accumulator box positioned beneath said dispensing bins, said accumulator box having a plurality of compartments, one compartment being in communication with each dispensing bin, each said compartment having a dispensing opening in the bottom thereof, each dispensing opening having a metering slide associated therewith, said slide being operable to adjust the size of said opening in a first direction;
   d. metering means mounted for rotation beneath each compartment of said accumulator box;
   e. two metering bars being positioned between each said metering slide and said metering means, one said bar being positioned on a side of said accumulator box dispensing opening opposite said other bar, said bars being operable to adjust the size of said accumulator box dispensing opening in a second direction;
   f. spreader means located beneath said metering means for receiving material metered from said compartments and broadcasting same over the lawn being treated;

g. drive means for said metering means and said spreader means; and h. aerating and rolling means attached to said frame.

16. A lawn building and maintenance unit as defined in claim 15 wherein said spreader means comprises a rotatable plate, said plate having a plurality of ribs mounted thereon and extending upwardly therefrom.

17. A lawn building and maintenance unit as defined in claim 15 wherein said drive means for said metering means comprises a chain drive arrangement.

18. A lawn building and maintenance unit as defined in claim 17 wherein said chain drive system includes switch means for interrupting driving power from said system as desired.

19. A lawn building and maintenance unit as defined in claim 17 wherein said chain drive system includes one way clutch means for permitting driving power in one direction only.

20. A lawn building and maintenance unit as defined in claim 15 wherein said aerating and rolling means comprises at least one cylindrical member having a plurality of tines positioned around its periphery.

21. A lawn building and maintenance unit as defined in claim 20 wherein said tines are positioned around the periphery of said cylindrical member so as to form a series of adjacent diamonds around the periphery of said cylindrical member.

22. A lawn building and maintenance unit as defined in claim 20 wherein said aerating and rolling means comprises two cylindrical members, said cylindrical members each having a plurality of tines positioned around the periphery thereof, said tines being positioned so as to permit the surface being treated to be rolled immediately prior to ingress of the tines.

23. A lawn building and maintenance unit as defined in claim 15 wherein further, said metering means is a driven cylindrical member having a plurality of grooves extending across its width; said spreader means is a rotatable plate having a plurality of ribs thereon and extending upwardly therefrom and said aerating and rolling means is at least one cylindrical member having a plurality of tines positioned around the periphery thereof.

* * * * *